United States Patent [19]

Shigeeda et al.

[11] Patent Number: 5,694,486
[45] Date of Patent: Dec. 2, 1997

[54] IMAGE PROCESSING APPARATUS AND METHOD FOR DESIGNATING ONE OF A PLURALITY OF OPERATING MODES

[75] Inventors: Nobuyuki Shigeeda; Yoshihiro Ishida, both of Kawasaki, Japan

[73] Assignee: Canon Kabushiki Kaisha, Tokyo, Japan

[21] Appl. No.: 384,253

[22] Filed: Feb. 6, 1995

[30] Foreign Application Priority Data

Feb. 7, 1994 [JP] Japan ................................. 6-013786
Jan. 19, 1995 [JP] Japan ................................. 7-006414

[51] Int. Cl.[6] ........................ G06K 9/48; G06K 9/32; H04N 1/387
[52] U.S. Cl. ........................ 382/197; 382/199; 382/295; 382/296; 382/298; 358/450; 358/452
[58] Field of Search .............................. 382/297, 296, 382/298, 293, 294, 295, 276, 302–303, 197, 199, 216, 256, 266; 358/448, 449, 450, 451, 452; 395/102

[56] References Cited

U.S. PATENT DOCUMENTS

| | | | |
|---|---|---|---|
| 5,051,843 | 9/1991 | Hayashi | 358/450 |
| 5,093,870 | 3/1992 | Watanabe | 382/300 |
| 5,301,036 | 4/1994 | Barrett et al. | 358/448 |
| 5,337,161 | 8/1994 | Hube | 358/448 |
| 5,357,348 | 10/1994 | Moro | 358/450 |
| 5,465,163 | 11/1995 | Yoshihara et al. | 358/444 |
| 5,475,475 | 12/1995 | Kohtani et al. | 358/449 |
| 5,508,810 | 4/1996 | Sato | 382/297 |
| 5,579,405 | 11/1996 | Ishida et al. | 382/197 |

*Primary Examiner*—Leo Boudreau
*Assistant Examiner*—Bhavesh Mehta
*Attorney, Agent, or Firm*—Fitzpatrick, Cella, Harper & Scinto

[57] ABSTRACT

An image processing apparatus comprises an input unit for inputting image data, an extracting unit for extracting outline data on the basis of the inputted image data, a deriving unit for performing size change, rotation, and movement processes to the extracted outline data and for deriving outline data corresponding to an image to be outputted, a forming unit for forming image data on the basis of the derived outline data, and an output unit for outputting the formed image.

14 Claims, 11 Drawing Sheets

FIG. 3A
RASTER SCAN : 3×3 WINDOW
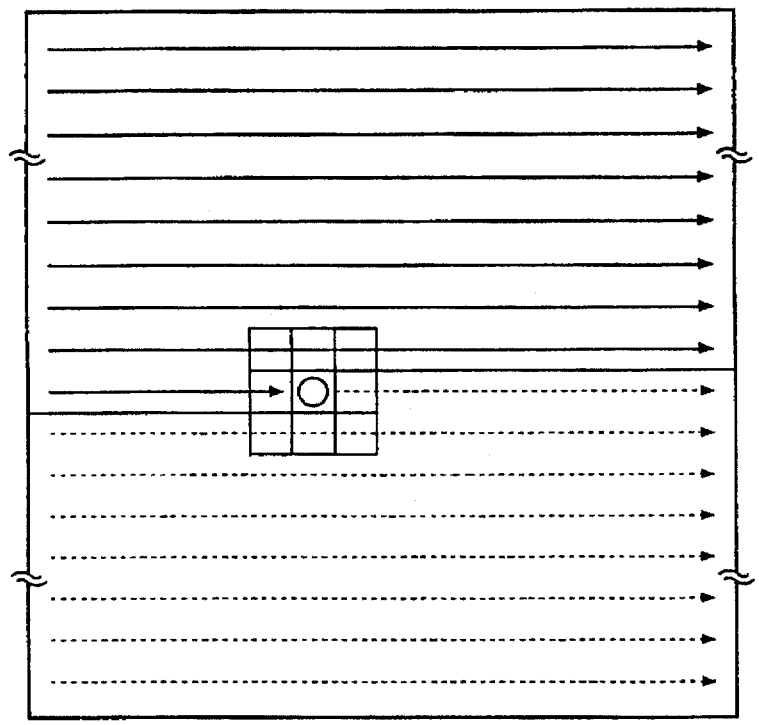
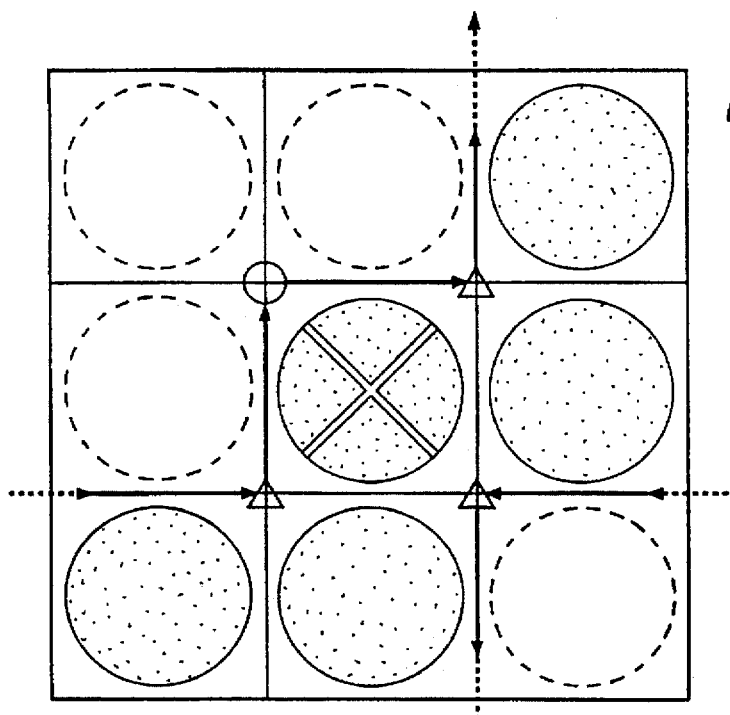
FIG. 3B
PATTERN MATCHING : 3×3 WINDOW $$\begin{pmatrix} X' \\ Y' \end{pmatrix} = a \begin{pmatrix} \cos b & -\sin b \\ \sin b & -\cos b \end{pmatrix} \begin{pmatrix} X \\ Y \end{pmatrix} + \begin{pmatrix} X0 \\ Y0 \end{pmatrix}$$

| (x0, y0) | (x0, y0) |
|---|---|
| (x1, y0) | (x1) |
| (x1, y1) | (y1) |
| (x2, y1) → | (x2) |
| (x2, y2) | (y2) |
| (x3, y2) | (x3) |
| (x3, y3) | (y3) |
| (x4, y3) | (x4) |

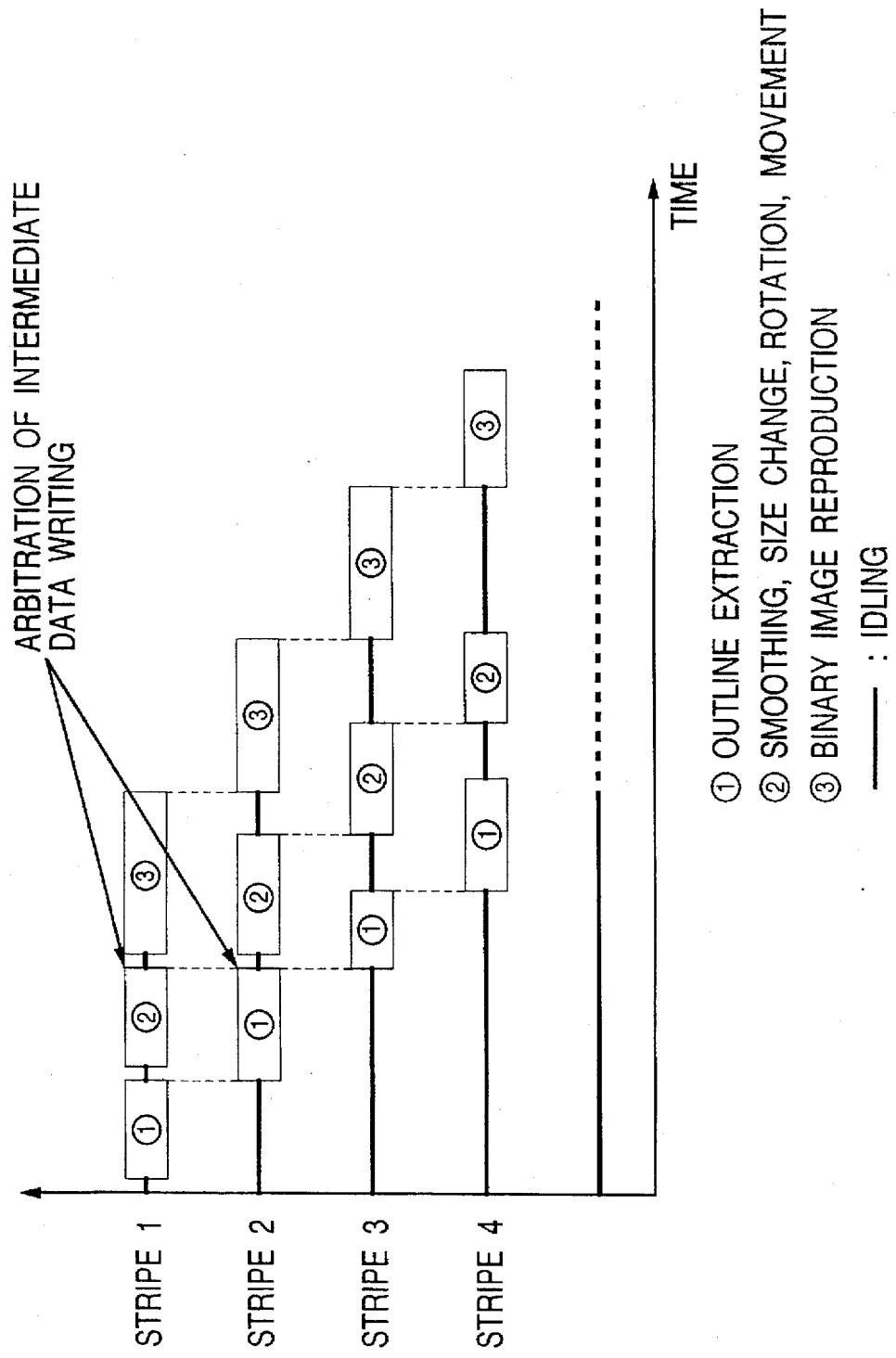

FIG. 9A UNCHANGED
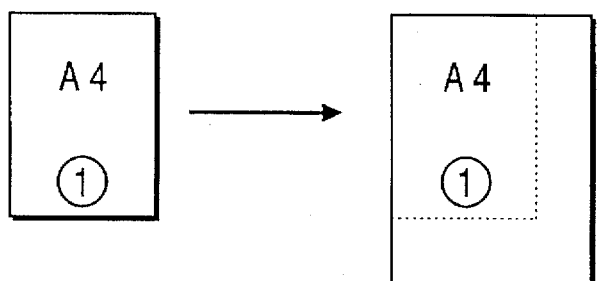
FIG. 9B SIZE CHANGED
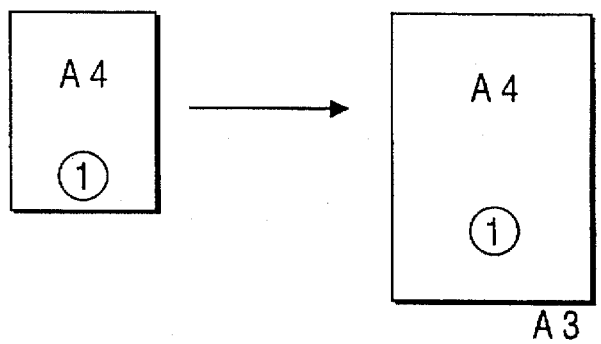
FIG. 9C ROTATED AND MOVED
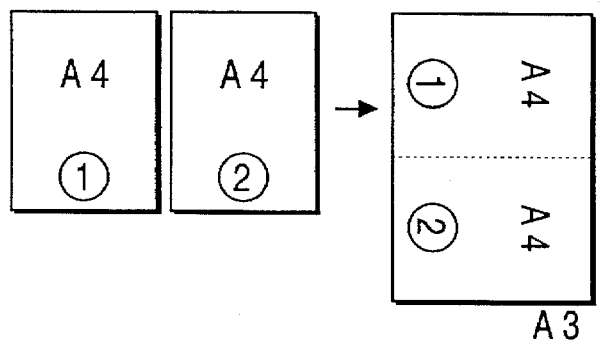
FIG. 9D SIZE CHANGE AND MOVED
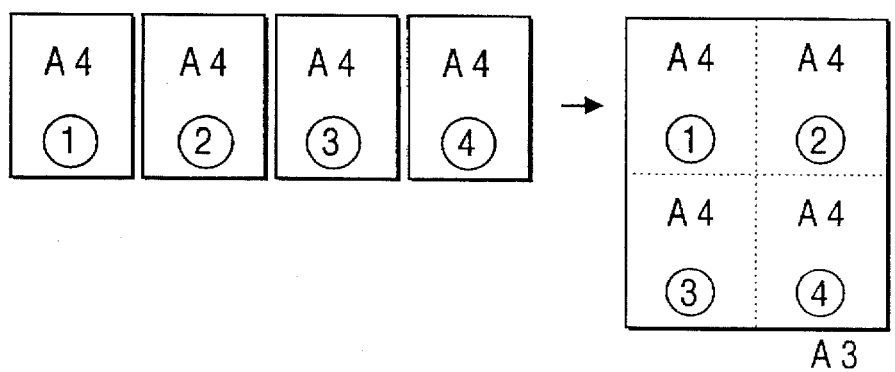

UNCHANGED

SIZE CHANGED, MOVED AND ROTATED

SIZE CHANGED AND MOVED

FIG. 11

| | SIZE CHANGE | MOVEMENT | ROTATION AND MOVEMENT |
|---|---|---|---|
| FIG. 9A | | | |
| FIG. 9B | ○ | | |
| FIG. 9C | | | ○ |
| FIG. 9D | ○ | ○ | |

DEFAULT (FIG. 9A)

| | ROTATION | SIZE CHANGE AND MOVEMENT |
|---|---|---|
| FIG. 9E | | |
| FIG. 9F | ○ | ○ |
| FIG. 9G | | ○ |

DEFAULT (FIG. 9E)

IMAGE PROCESSING APPARATUS AND METHOD FOR DESIGNATING ONE OF A PLURALITY OF OPERATING MODES

BACKGROUND OF THE INVENTION

1. Field of the Invention

The present invention relates to an image processing method and apparatus which performs an image process, particularly, an outline process.

2. Related Background Art

Hitherto, as a method of performing a size change or a rotation process on an image, there is a method of processing image data as it is in a bit map form. That is, the size of the image is changed by performing thinning out or overlapping process on a pixel unit basis. The image is rotated by performing an address arithmetic operation on a memory address on a bit map in which image data has been stored.

The conventional technique mentioned above, however, has the problem that when the image size is large, the image processing time for performing the process of the size change, rotation, or the like of the image is long.

The present invention has been developed in consideration of such a conventional apparatus. It is an object of the present invention to provide an image processing method and apparatus which performs an image process at a high speed.

SUMMARY OF THE INVENTION

According to an embodiment of the invention, there is provided an image processing apparatus comprising:

input means for inputting image data;

extracting means for extracting outline data on the basis of the inputted image data;

deriving means for performing size change, rotation, and movement processes on the extracted outline data and for deriving outline data corresponding to an image to be outputted;

forming means for forming image data on the basis of the derived outline data; and output means for outputting the formed image.

According to another embodiment of the invention, there is provided an image processing method comprising:

an input step of inputting image data with input means;

an extracting step of extracting outline data on the basis of the inputted image data;

a deriving step of performing size change, rotation, and movement processes on the extracted outline data and deriving outline data corresponding to an image to be outputted;

a forming step of forming image data on the basis of the derived outline data; and an output step of outputting the formed image with output means.

The above and other objects and features of the present invention will become apparent from the following detailed description and the appended claims with reference to the accompanying drawings.

BRIEF DESCRIPTION OF THE DRAWINGS

FIG. 3 is a conceptional diagram of an outline vector extracting step in an outline smoothing process;

FIG. 8 is a diagram showing a process execution of a pipeline process of an image divided into stripes which is realized by a process arbitrator;

FIGS. 9A to 9G are diagrams showing output examples in a plurality of outputting modes;

FIG. 11 is a conceptional diagram of a parameter set in a parameter setter.

DETAILED DESCRIPTION OF THE PREFERRED EMBODIMENTS

[First embodiment]

An outline of an outline image processing method and apparatus (hereinlater, referred to as "outline image processor") according to an embodiment of the present invention to accomplish the above-mentioned object will be described hereinbelow. Outline vector information (outline data) of image data is extracted, a smoothing operation is performed from the outline vector information of the image data, the size of the outline vector information is changed in accordance with a predetermined magnification, an rotation arithmetic operation is executed from the outline vector information, and a binary image of the raster scan type is formed on the basis of the outline vector information. The outline image processor has a work memory to hold intermediate data when executing the arithmetic operation. Further, the outline image processor has a process arbitrator to control the priority order of the input and output of the intermediate data (outline vector) which is necessary in each processing section to/from the work memory.

In this instance, the outline vector information has a 2-dimensional coordinates form. The size change, smoothing, and rotation of the image are executed by a series of arithmetic operations for the outline vector information extracted in the 2-dimensional coordinates form. Therefore, the conversion in the processing form as described in the conventional technique or the like is unnecessary, so that the processing time is reduced.

The outline image processor of the embodiment divides an image into stripe shapes on a raster unit basis by arbitrating the accesses to the work memory by the process arbitrator, thereby enabling pipeline processes such as outline vector extraction, smoothing/size change, and binary image reproduction to be executed on a stripe unit basis. Thus, the capacity of the work memory can be reduced and the processing time can be further reduced.

A preferred embodiment of the invention will now be described hereinbelow with reference to the drawings.

Figure 1:
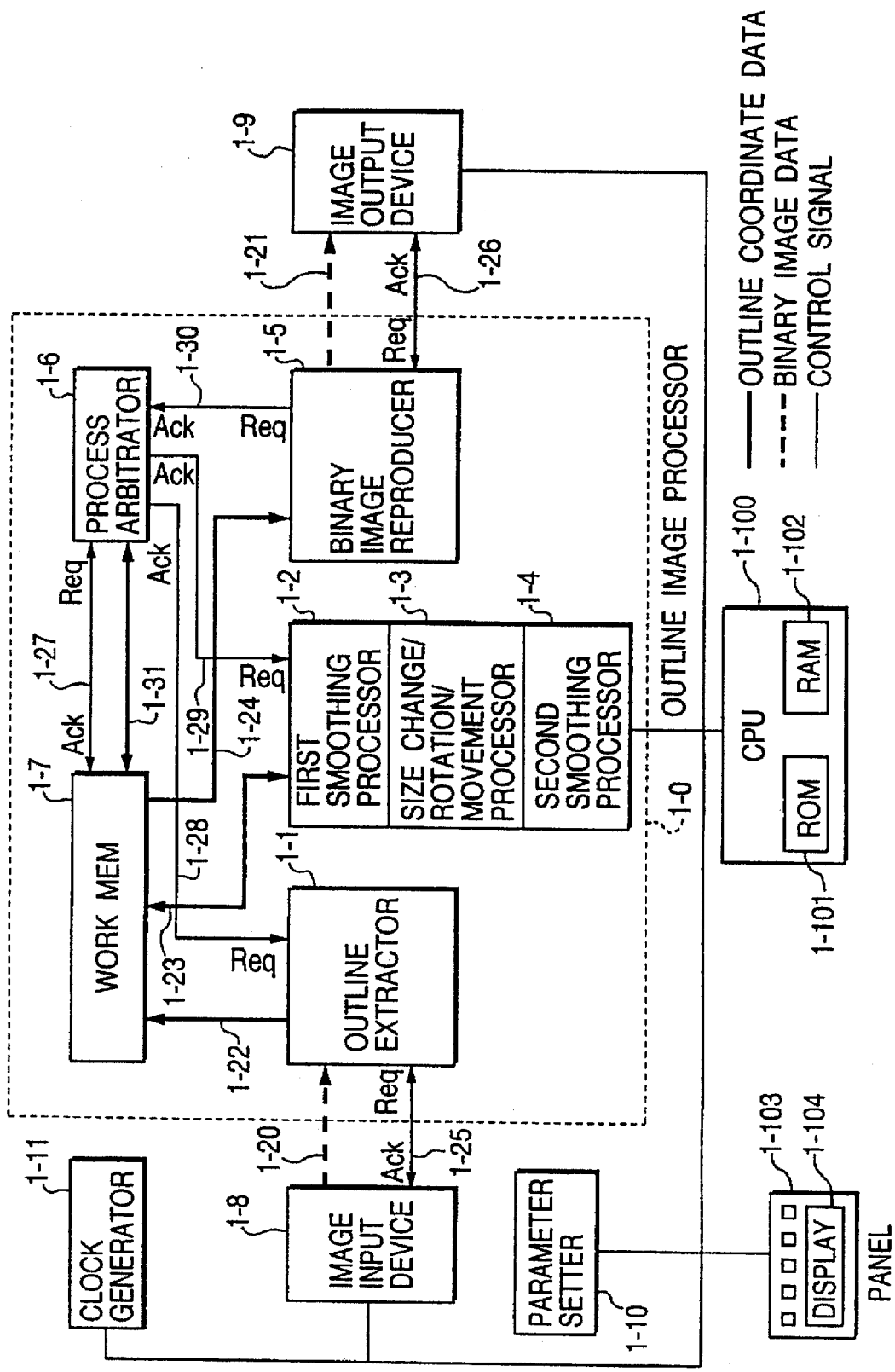
FIG. 1 is a block diagram of an outline image processor of the first embodiment.

FIG. 1 is a constructional diagram of an image processing apparatus including an outline image processor according to the embodiment. In this instance, the image processing apparatus assumes the form of an apparatus which includes each apparatus for inputting/outputting an image and various components (CPU, ROM, RAM) to make the image processing apparatus function and the like and which intends to perform a process for copying, transmission/reception, filing, and the like of the image. Reference numeral 1-0 in FIG. 1 denotes an outline image processor of the embodiment for performing an arbitrary size change, rotation, and smoothing of an image. In this case, "smoothing" denotes that notched portions in the outline portion of the image are suppressed and smoothed. Reference numeral 1-8 denotes an image input device such as a scanner or the like. The image data that is outputted from the image input device 1-8 has a bit map form such that one pixel is allocated to one memory address and is dealt with as data. Reference numeral 1-9 indicates an image output device such as a serial printer, a laser beam printer, an image display, or the like. The image data to be inputted has the above-mentioned bit map form. Reference numeral 1-10 denotes a parameter setter for setting parameters necessary to activate the image processing apparatus. Specifically, the parameter setter 1-10 sets a size change ratio in the size changing process, a rotational angle in the rotation process, an activation or stopping of the image process, the control of programs according to a flowchart, which will be described later, and the like. Reference numeral 1-11 denotes a clock generator for supplying operation timing clocks in various processes in the image processing apparatus. Each processing section in the image processing apparatus is connected to the clock generator 1-11 and operates synchronously with a generated sync clock. Reference numeral 1-100 indicates a CPU for controlling the whole apparatus on the basis of various programs stored in an ROM 1-101. Reference numeral 1-102 denotes an RAM which is used as a work area; 1-103 denotes an operation panel by which various modes can be designated; and 1-104 denotes a display for displaying various messages.

The internal construction of the outline image processor 1-0 of the embodiment will now be described. Reference numeral 1-1 denotes an outline extractor having the function to extract information of the outline portion of the image as vector information from image data of the bit map form inputted from the image input device 1-8 and to output as outline vector coordinate information. According to the vector extraction, vectors are extracted from the periphery of a target pixel while raster scanning a matrix of a specific shape comprising neighboring pixels around the target pixel in the main scan direction of the image.

FIG. 3 is a conceptional diagram of the vector extraction in case of assuming a (3×3) matrix. In FIG. 3, a painted circle denotes a black pixel and a blank circle (a circle of a broken line) denotes a white pixel. The pixel located at the center of the matrix is the target pixel which is shown by "X". Among the extracted outline vectors, a start point of the vertical vector is shown by "Δ" and a start point of the horizontal vector is shown by "O". The outline vector information to be extracted is a set of coordinate values where "Δ" and "O" are located.

Reference numeral 1-20 in FIG. 1 denotes a data bus from the image input device to the outline extractor. The image data is still expressed in the bit map form on the data bus 1-20. Reference numeral 1-25 denotes a control signal for controlling the data transfer from the image input device to the outline extractor. A data buffer (not shown) to temporarily store the image data before a process is performed is prepared in the outline extractor. The control signal 1-25 controls the transfer of the image data to the data buffer. That is, when the data buffer in the outline extractor 1-1 is empty, a data request (Req.) signal is generated and sent to the control signal 1-25. By receiving the Req. signal, the image input device 1-8 prepares the image data on the data bus 1-20 and subsequently allows the control signal 1-25 to generate a data acknowledge (Ack.) signal. The outline extractor 1-1 receives the Ack. signal and holds the image data in the data buffer. Thus, the data is smoothly transferred between the outline extractor and the image input device and data extinction due to the overwriting on the data buffer or the like can be prevented.

Reference numeral 1-7 in FIG. 1 denotes a work memory for temporarily holding intermediate data (outline vector coordinate data) in association with the outline image process. For example, the intermediate data that is outputted from the outline extractor 1-1 is obtained by extracting the outline portion of the image and is prime outline vector data which is not yet subjected to the processes such as smoothing, size change, rotation, or the like. The work memory holds the prime outline vector data until the apparatus shifts to the next process for smoothing or the like. The amount of intermediate data remarkably changes due to factors such as size, complication, or the like of the image. When a method of dividing the image into stripes and performing the outline image process to each image stripe is used, however, the capacity of the work memory can be reduced by dividing the image into small stripes.

In this case, the outline extraction and each process of smoothing, size change, and binary image reproduction, which will be described hereinbelow, can be pipeline processed. The control of the pipeline process is realized by controlling the priority order with a process arbitrator.

By dividing the image into stripes and performing the pipeline process, the processing time and work memory can be reduced.

According to the conventional method, the form of the intermediate data which is accumulated in the work memory 1-7, namely, the outline vector coordinate data is set to the 2-dimensional coordinate data. However, the start point of the outline vector data which was outline extracted and the length of the vector (the difference value between the start and end points) can be also set as a form of the intermediate data (refer to FIGS. 5A and 5B). Such a method uses a feature such that a horizontal vector and a vertical vector are certainly extracted from the outline vector coordinate data. By using the data form according to such a method, the capacity of the work memory can be further reduced. That is, the image whose outline vectors were extracted forms a closed loop (hereinbelow, referred to as "outline vector loop") which is constructed by those outline vectors. Therefore, one image is expressed by a set of a plurality of outline vector loops and FIG. 5A shows one of the outline vector loops as an example.

Figures 4, 5A, 5B:
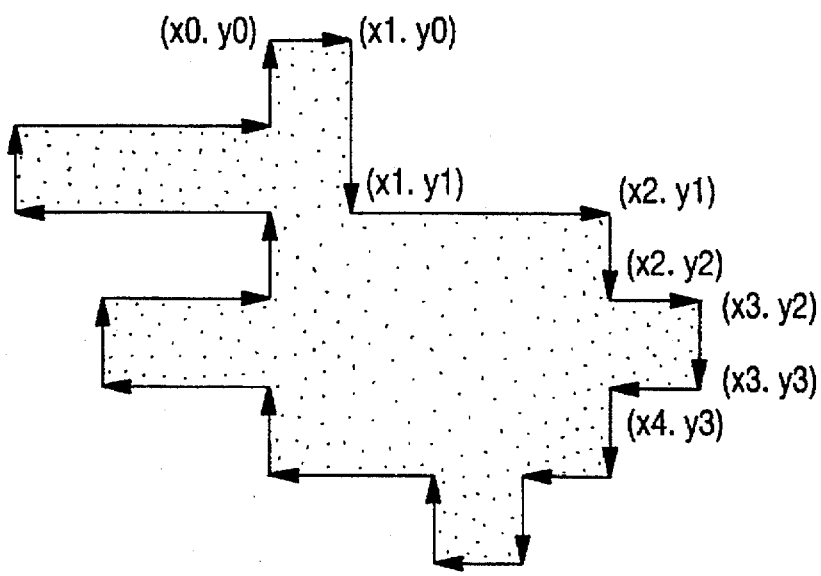
FIG. 4 is a diagram showing an arithmetic expression to execute size change, rotation, and movement of an outline image.
FIGS. 5A and 5B are conceptional diagrams of a data format in case of using vector difference values of prime outline vector coordinate data regarding an outline vector extraction.

In FIGS. 5A and 5B, the outline vector loop is constructed by a plurality of outline vectors and the left coordinate data in FIG. 5B shows the outline vectors. As shown on the right side in FIG. 5B, by having one coordinate point constructing the outline vector loop and only lengths of the vectors as data, the data amount of one outline vector loop can be reduced.

Reference numeral 1-22 in FIG. 1 denotes an intermediate data bus for transferring the prime outline vector data from the outline extractor 1-1 to the work memory 1-7. Reference numeral 1-2 denotes a first smoothing processor for inputting the prime outline vector data, performing the smoothing process, and outputting the smoothed outline vector data. The smoothing process is executed on a unit basis of the outline vector loop which was outline extracted. The smoothing process is performed by again giving new outline vector coordinates in accordance with predetermined vector patterns before and after the vector loops for the target vector.

Reference numeral 1-3 indicates a size change/rotation/movement processor. Both of the input data and the output data for the processor 1-3 are the outline vector data. The processor 1-3 executes the size change/rotation/movement processes on the outline vector data after completion of the first smoothing process. The output outline vector data from the size change/rotation/movement processor 1-3 is obtained by calculating the arithmetic expression shown in FIG. 4.

In FIG. 4, reference character (x) denotes the axis of the abscissa component (main scan direction component) of the outline vector coordinate data; (y) denotes the axis of the ordinate component (sub scan direction component) of the outline vector coordinate data; (x') denotes the axis of the abscissa component (main scan direction component) of the outline vector coordinate data after the process; (y') denotes the axis of the ordinate component (sub scan direction component) of the outline vector coordinate data after the process; (a) denotes the size change ratio; and (b) denotes the rotational angle. In this instance, x0 and y0 denote deviation amounts in the case of moving the outline vector coordinates (x0: main scan direction, y0: sub scan direction). By adding the deviation amounts to the outline vector coordinate data, not only the size change and rotation of the image but also the movement of the image can be realized. All of the above series of product sum arithmetic operations are executed on the outline vector coordinate data and it is unnecessary to convert the form of the data as in the conventional method. Therefore, the processes can be executed at a high speed.

Reference numeral 1-4 denotes a second smoothing processor. Both the input data and the output data of the processor 1-4 are the outline vector data. The processor 1-4 executes processes on the outline vector data after completion of the size change/rotation processes. The second smoothing processor 1-4 obtains the weighted means of the target outline vector coordinates and the outline vector coordinates before and after the target outline vector, thereby further smoothing the outline vector loop.

Figure 6:
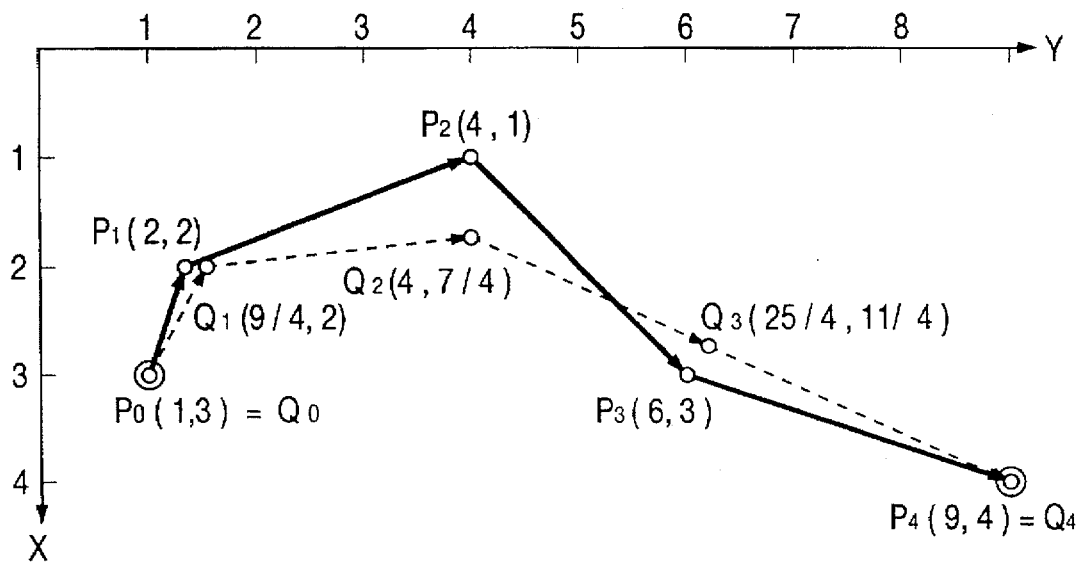
FIG. 6 is a conceptional diagram of the second smoothing process.

FIG. 6 is a diagram showing schematically the second smoothing process. A solid line denotes a vector loop before the second smoothing process is performed. A broken line shows the result of the weighted means process of the outline vector coordinates by the second smoothing process. According to the example of FIG. 6, the outline vector coordinates shown by "⊙" denote the points which are not smoothed and the weighted means is obtained with respect to the coordinate points locating between the outline vector coordinates.

Referring again to FIG. 1, reference numeral 1-23 denotes an intermediate data bus for transferring the outline vector data from the first smoothing processor 1-2, the size change/rotation/movement processor 1-3, and the second smoothing processor 1-4 to the work memory 1-7. Reference numeral 1-5 indicates a binary image reproducer for inputting the outline vector coordinate data which was subjected to the smoothing, size change/rotation processes and for reproducing and outputting a binary image in a bit map form on the basis of the outline vector coordinate data.

Figure 7:
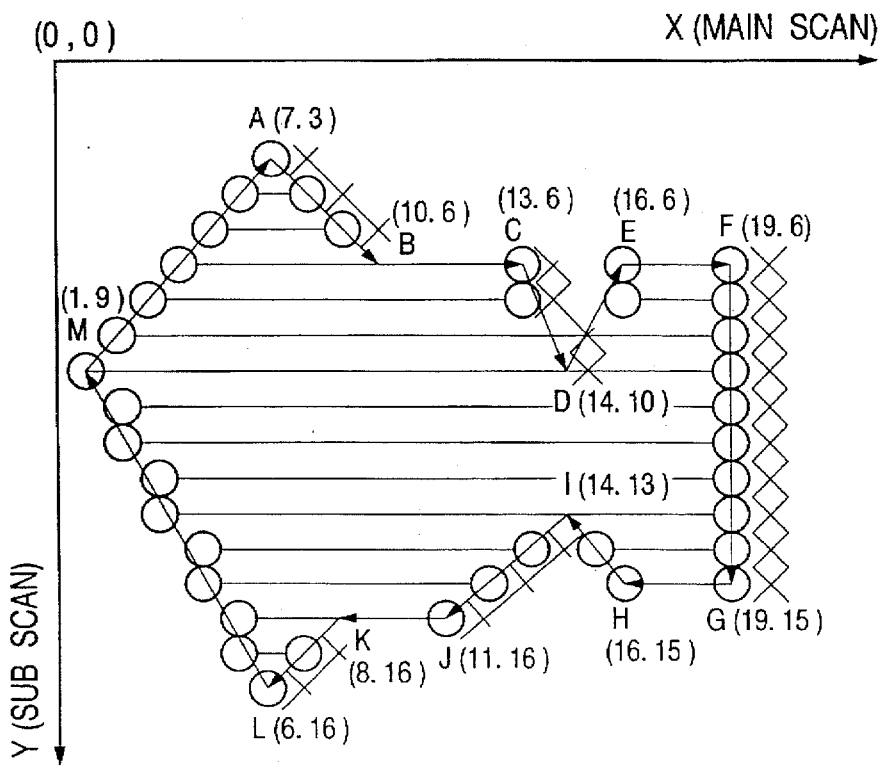
FIG. 7 is a conceptional diagram of a raster image forming step in the outline smoothing process.

FIG. 7 is a diagram schematically showing a binary image reproducing method from the outline vector coordinate data.

First, the outline points on the vector are drawn from the outline vector data. Subsequently, while executing the operation of the raster type from the left edge of the image, the black and white inversion is performed every time the drawn outline point appears. In this instance, it is defined such that the left edge of the image always starts from the white pixel. In FIG. 7, an arrow shows the outline vector and a blank circle indicates the outline point drawn on the outline vector. A region in the closed loop surrounded by the outline vectors is reproduced as a black pixel area.

Reference numeral 1-24 in FIG. 1 denotes an intermediate data bus for transferring the outline vector data from the work memory 1-7 to the binary image reproducer 1-5. Each of the above three intermediate data buses accesses the work memory 1-7. Therefore, when either one of the outline extractor 1-1, the smoothing processor 1-2, size change/rotation processor 1-3, the second smoothing processor 1-4, and binary image reproducer 1-5 simultaneously accesses the work memory, the data is destroyed. Therefore, it is necessary to control the order of the intermediate data. A process arbitrator 1-6 has the function of deciding the access priority order of the work memory from each processor and to further manage memory addresses of the work memory. The process arbitrator 1-6 is connected to the work memory 1-7, the outline extractor 1-1, the smoothing processors 1-2 and 1-4, the size change/rotation processor 1-3, and the binary image reproducer 1-5 by control signals 1-27, 1-28, 1-29, and 1-30, respectively. For example, when the outline extractor 1-1 transfers the extracted prime outline vector data to the work memory 1-7, the prime outline vector data is first prepared on the intermediate data bus 1-22. After that, when a data request signal is generated to the control signal 1-28 and there is no access to the work memory 1-7 by the other processes, the data request signal is directly transferred to the control signal 1-27 and is sent to the work memory. In this instance, the process arbitrator generates a memory address to hold the data from the outline extractor on an address bus 1-31. The work memory 1-7 fetches the prime outline vector data prepared on the data bus 1-22 and holds the data in a predetermined address on the address bus 1-31. After that, a data acknowledge signal is returned to the control signal 1-27 and is further returned to the control signal 1-28 via the process arbitrator 1-6.

In the case where another access from the binary image reproducer 1-5 to the work memory 1-7 competes with the access from the outline extractor 1-1 to the work memory 1-7, the data request signals are generated to both of the control signals 1-28 and 1-30. In this case, the process arbitrator 1-6 preferentially chooses the data request signal from the binary image reproducer having the higher priority, thereby generating a predetermined address to read the data from the binary image reproducer 1-5 onto the address bus 1-31. After completion of the data transfer to the binary image reproducer, the address of the data to be transferred from the outline extractor is generated on the address bus 1-31 and the data request signal is sent from the outline extractor to the work memory.

The priority order of the right to access to the work memory 1-7 has been set in a manner such that the binary image reproducer 1-5 has the highest priority and the smoothing processors and the size change/rotation processor have the second and third priorities, respectively, and the outline extractor has the lowest priority. When no data competition occurs, the priority order is not applied and ordinary memory access is performed as mentioned above.

By the arbitration of the processes by the process arbitrator 1-6, the outline image processor 1-0 can execute the pipeline processes of the steps of the outline extraction, smoothing/size change/movement, and binary image reproduction.

FIG. 8 is a diagram showing a process execution in the case where one image is divided into stripes and pipeline processes are performed. In FIG. 8, the axis of the abscissa denotes a time base of various image processes and the axis of the ordinate shows each stripe name to be processed. The image process is divided into:

(1) an outline extracting step, (2) a smoothing, size change, rotation, and movement step, and (3) a binary image reproducing step.

Each step constitutes a pipeline processing step. The outline extracting step is executed by the outline extractor 1-1. The smoothing, size change, rotation, and movement step is executed by the first smoothing processor 1-2, the size change/rotation/movement processor 1-3, and the second smoothing processor 1-4. The binary image reproducing step is executed by the binary image reproducer 1-5. The function of the buffer memory to synchronize the steps, namely, to synchronize the outline extracting step and the smoothing, size change, rotation, and movement step and to synchronize the smoothing, size change, rotation, and movement step and the binary image reproducing step is performed by the work memory 1-7.

The internal construction of the outline image processor 1-0 to perform the pipeline image processes has been described above.

Reference numeral 1-21 in FIG. 1 denotes a data bus from the binary image reproducer 1-5 to the image output device 1-9. The image data is expressed in bit map form in the binary image reproducer 1-5 and is transferred to the image output device 1-9 via the data bus 1-21. Reference numeral 1-26 denotes a control signal for controlling the data transfer from the binary image reproducer 1-5 to the image output device 1-9. A data buffer for temporarily holding the processed image data is prepared for the binary image reproducer 1-5. The control signal 1-26 controls the transfer of the image data from the data buffer. That is, when the data is accumulated in the data buffer in the binary image reproducer 1-5, a data request (Req.) signal is generated onto the control signal 1-26. In association with it, the image data is prepared on the data bus 1-21. By receiving the data request signal, the image output device 1-9 fetches the data on the data bus 1-21 and allows the control signal 1-25 to generate a data acknowledge (Ack.) signal. The binary image reproducer 1-5 receives the Ack. signal and further accumulates the image data in the data buffer. Thus, the data is smoothly transferred between the binary image reproducer 1-5 and the image output device 1-9 and data extinction due to a failure of the fetching of the image data in the image output device 1-9 or the like can be prevented.

[Second embodiment]

Figure 2:
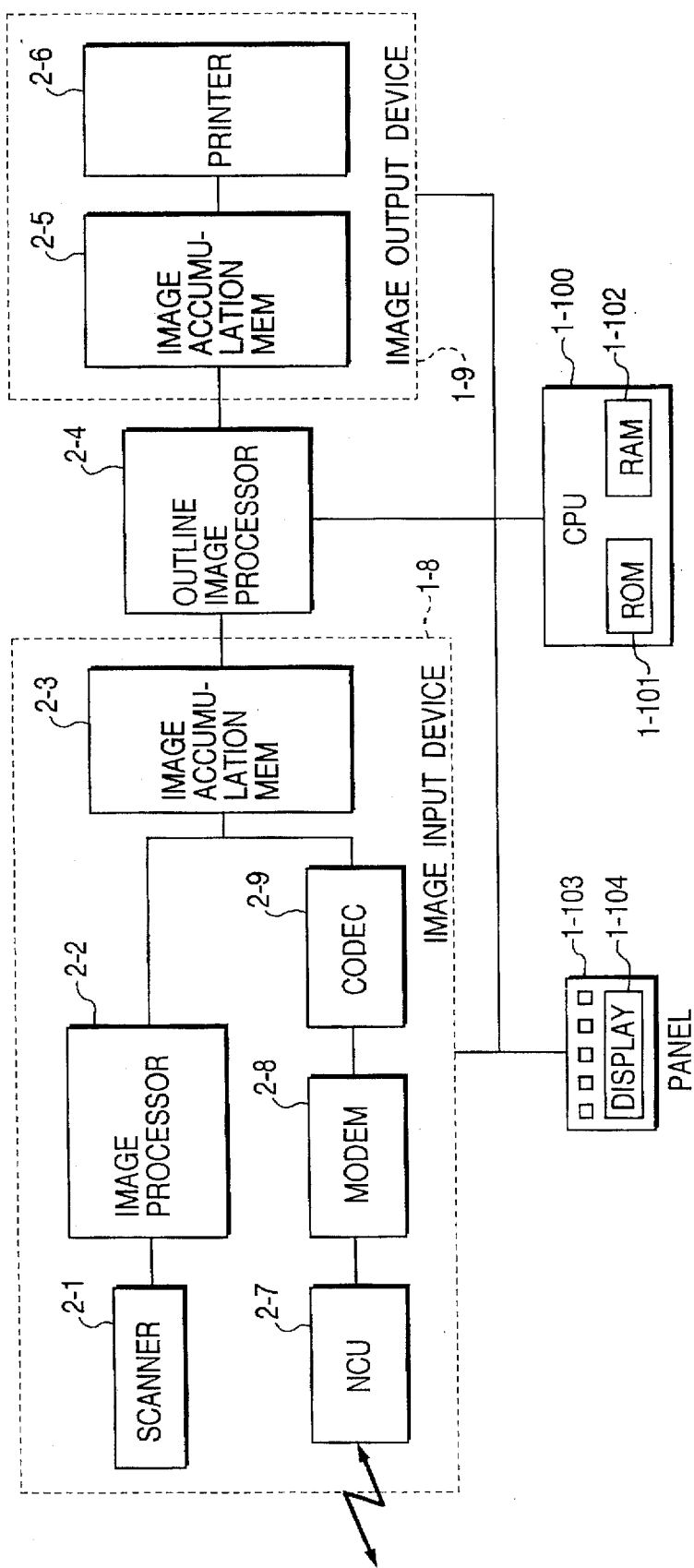
FIG. 2 is a diagram showing an application example of an outline image processor of the second embodiment.

FIG. 2 shows an embodiment when the image processing apparatus of the first embodiment is applied to a facsimile. Particularly, the CPU 1-100 controls each apparatus of the facsimile on the basis of the programs stored in the ROM 1-101. In FIG. 2, image input means constituted by a scanner and image input means constituted by a communication apparatus such as a MODEM or the like are included as a portion corresponding to the image input device 1-8 in FIG. 1.

Reference numeral 2-1 in FIG. 2 denotes a scanner having a resolution of 200 dpi since the data amount upon transmission needs to be reduced as much as possible in order to use the scanner in the facsimile transmission. Reference numeral 2-2 indicates an image processor for performing an ABC correction and a shading correction on an image to be read out. The image processor 2-2 performs a luminance/density conversion, an edge emphasis, and a binarizing process on the read image.

The ABC correction is to correct a change in image reading intensity in association with the deterioration of the scanner as it ages. The shading correction denotes a process to correct the unevenness of a light amount from a light source of the scanner. Further, the luminance/density conversion is used to convert the image data as a reflection intensity (luminance) of light to density data when printing on paper. The edge emphasis operation is a process to emphasize the edge portion of the image, thereby converting the image to a clearer image. Although the image data is used as multivalue data in the above processes, since the printer uses binary data of black and white, it is necessary to convert the image from multivalue data to binary data. The binarizing process is executed for this purpose. In the embodiment, particularly, the multivalue image data is converted to binary image data which falsely expresses the half tone by using an error diffusion method.

Reference numeral 2-3 denotes an image accumulation memory for temporarily holding the processed image. When the apparatus inherently transmits the image as a facsimile apparatus, the read image is temporarily held in the image accumulation memory 2-3 and is transmitted through a network control unit (NCU) 2-7. When the read image is copied, the image data held in the image accumulation memory 2-3 is processed by an outline image processor and is outputted onto the paper surface via the image output device 1-9 after that.

Reference numeral 2-4 denotes an outline image processor of the embodiment. In the outline image processor 2-4, the resolution is converted so as to match the resolution of a printer 2-6 and the image after completion of the resolution conversion is smoothed, thereby smoothing further the outline portion of the image. When the image is printed and outputted, the image is rotated and moved by the image rotating function of the outline image processor 2-4, thereby also enabling a plurality of images to be outputted onto one piece of paper.

Reference numeral 2-5 denotes an image accumulation memory for the output image. The image accumulation memory 2-5 temporarily holds the image processed by the outline image processor and functions as an image buffer to eliminate the difference between the print output speed and the processing speed of the outline image processor. The image accumulation memory 2-5 is also effective in the case of temporarily holding an image which doesn't need to be immediately printed and outputted.

Reference numeral 2-6 denotes the printer, for example, a binary printer such as laser beam printer, a bubble jet printer, or the like.

In the second embodiment, the image accumulation memory 2-5 and printer 2-6 correspond to the image output device 1-9 in FIG. 1. Particularly, each processing section in the above description is used in the copy mode of the facsimile device.

When the facsimile device receives the image, a communication apparatus, which will be described hereinbelow, functions as a portion corresponding to the image input device 1-8 of the first embodiment.

Reference numeral 2-7 denotes a network control unit (NCU) for connecting the facsimile apparatus with an external communication line. The NCU 2-7 has functions such as CI (calling indicator) detection, D/C loop holding, on-hook detection, and the like.

Reference numeral 2-8 denotes a MODEM having a function to modulate/demodulate the image signal which is transmitted/received via the communication line in accordance with the line characteristics.

Reference numeral 2-9 denotes a CODEC having a function to compress an enormous amount of data of the image signal and to reduce the communication time. The CODEC 2-9 also has a function to expand the compressed image data.

Figure 9E:
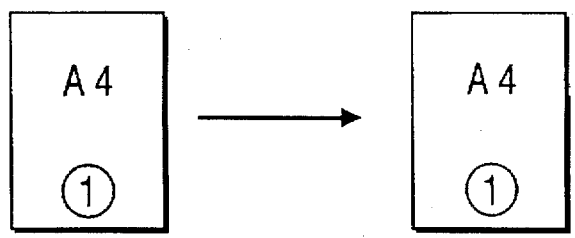
Figure 9F:
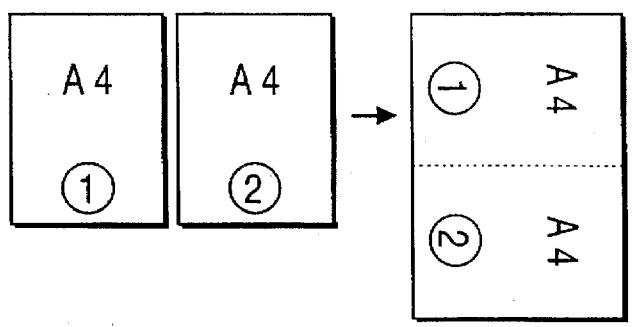

FIGS. 9A to 9G are diagrams for explaining the modes of the facsimile in the second embodiment. FIGS. 9A to 9G show examples when various processes are performed to the image to be copied or the received image. In the case where the image exists on a plurality of pages as shown in FIG. 9C or 9F, the image can be arranged in one page and can be outputted by using the size change/rotation/movement method of the embodiment. In the case where the facsimile device receives an image having the JIS standard A4 size (length 279 mm×width 210 mm) and the papers of the A3 size (length 594 mm×width 210 mm) have been set to the facsimile, the facsimile has a mode to output the image as it is on the A3 size paper as shown in FIG. 9A and a mode to change the size of the image as shown in FIG. 9B, thereby outputting a magnified image on the A3 size paper. In the case where two or more images of the A4 size are received, the apparatus has a mode to rotate each image by 90° and to move the images to their proper positions as shown in FIG. 9C, thereby enabling the images to be outputted by standard paper of the A3 size (length 594 mm×width 210 mm). Although one image of the A4 size has conventionally been outputted as it is to the A3 paper as shown in FIG. 9A, the peripheral region of the image of the A4 size is outputted as a blank, resulting in a waste of the paper. Such a problem, however, can be solved by rotating and moving the image and outputting the resultant image. Further, when a plurality of pages of the A4 size are received, as shown in FIG. 9D, the apparatus has a mode such that the images can be outputted to the standard paper of the A3 size by changing the size and moving them without rotating.

Figure 9G:
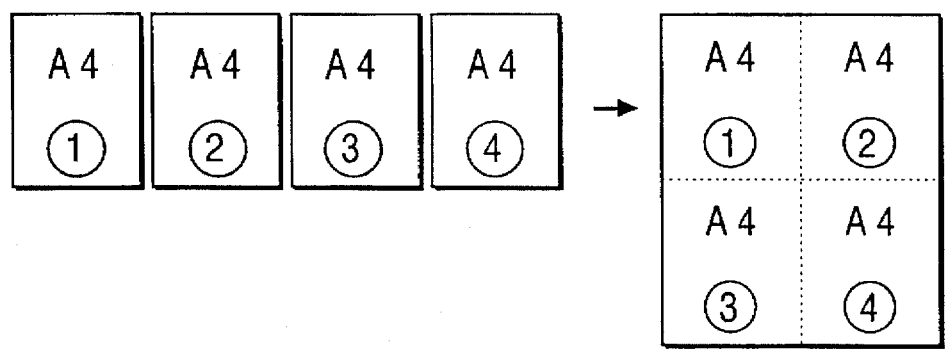

On the other hand, when the size of the received image and the size of the papers set to the facsimile coincide, the apparatus has a mode shown in FIG. 9E to output the image as it is, a mode shown in FIG. 9F such that a plurality of images of the A4 size are rotated, moved, and reduced, thereby outputting the plurality of images in a lump by one A4 standard paper, and a mode shown in FIG. 9G to change size and move a plurality of images and to output the images all together without rotating as shown in FIG. 9F.

Figures 10, 10A:
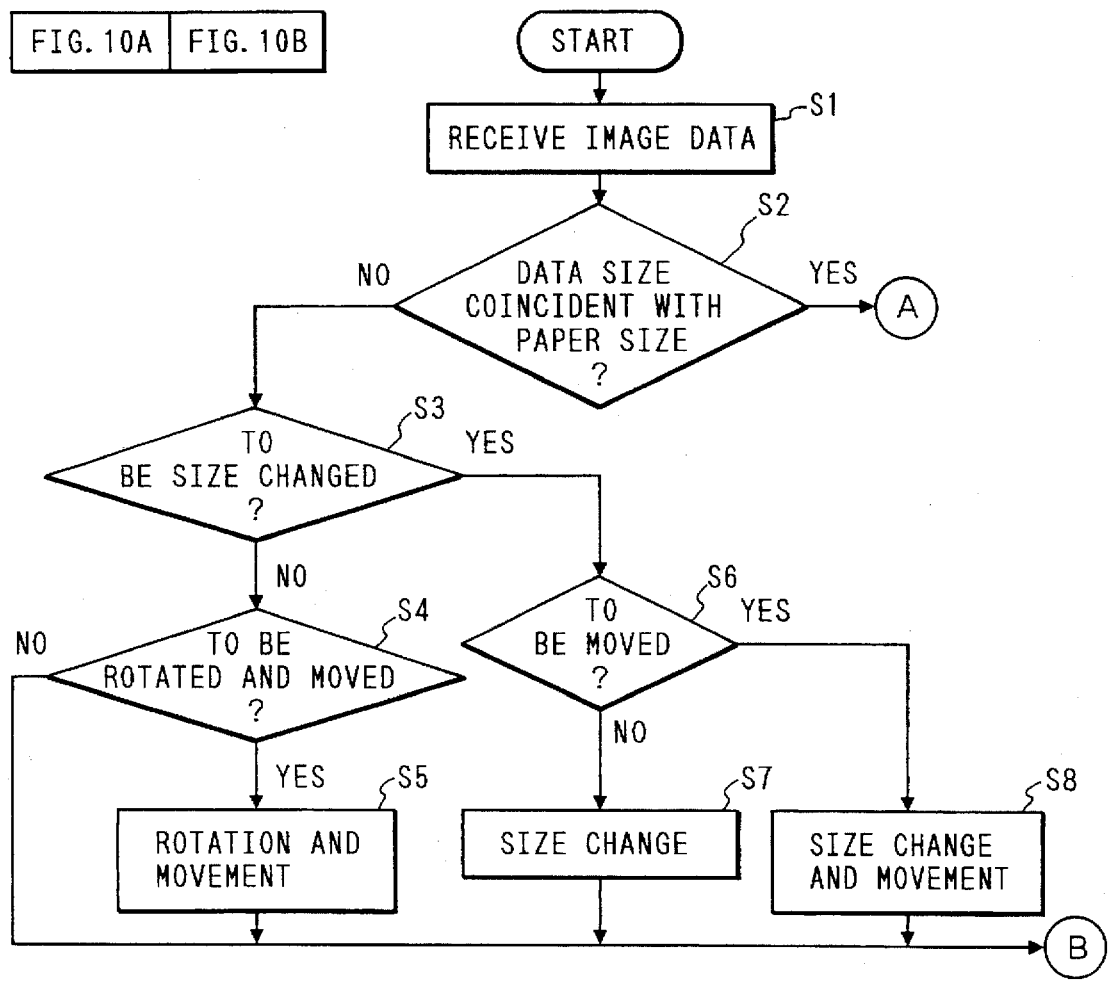
FIG. 10 comprises FIGS. 10A and 10B showing flowcharts of a control procedure in the second embodiment.
Figure 10B:
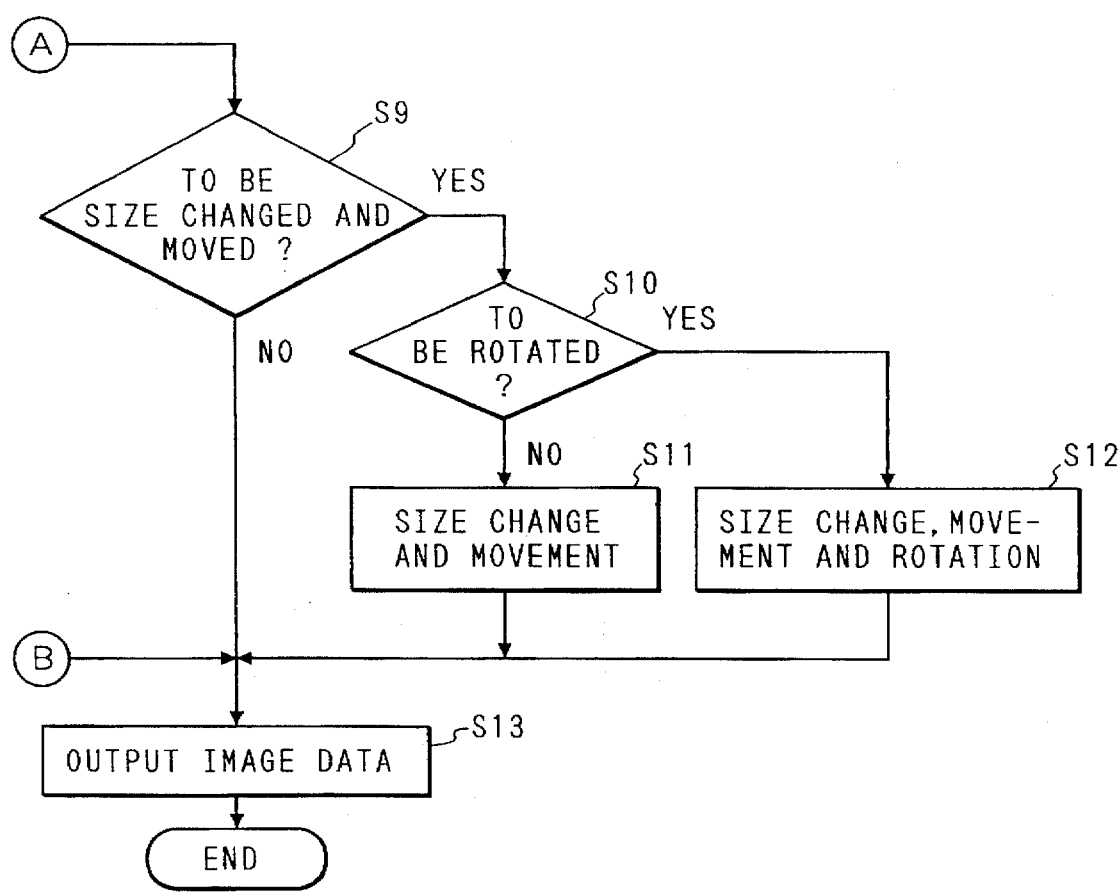

FIGS. 10A and 10B are flowcharts for explaining a control procedure to realize the processes of the various modes shown in FIGS. 9A to 9G of the facsimile device in the second embodiment. The programs according to the flowchart are stored in the ROM 1-101 and are executed by the CPU 1-100.

Each step of the flowchart will now be described hereinbelow.

In step S1, the image input device receives the image data.

In step S2, a check is made to see if the size of the received image data and the size of the paper set in the facsimile device coincide or not.

If NO in step S2, step S3 follows. In step S3, a check is made to see if the size is changed or not. If NO in step S3, step S4 follows. In step S4, a check is made to see if the image is rotated and moved or not. If NO in step S4, the processing routine advances to step S13 and the image output device executes a predetermined process on the received data and the resultant data is outputted (the mode of FIG. 9A). If YES in step S4, step S5 follows and the outline image processor extracts the outline data (outline vector information) from the received image data, the rotation/movement processes are performed on the extracted outline data, and a binary image is reproduced from the outline data which was subjected to the rotation/movement processes. Subsequently, step S13 follows and the image output device outputs the reproduced binary image (the mode of FIG. 9C). On the other hand, if YES in step S3, step S6 follows and a check is made to see if the image data is moved or not. If NO in step S6, step S7 follows. The outline image processor extracts the outline data from the received image data, the size change process is performed on the extracted outline data, and the binary image data is reproduced from the outline data which was subjected to the size change process. Subsequently, step S13 follows and the image output device outputs the reproduced binary image (the mode of FIG. 9B). If YES in step S6, step S8 follows. The outline image processor extracts the outline data from the received image data, the size change/movement processes are performed to the extracted outline data, and the binary image is reproduced from the outline data which was subjected to the size change/movement processes. Subsequently, step S13 follows and the image output device outputs the reproduced binary image (the mode of FIG. 9D).

If YES in step S2, step S9 follows and a check is made to see if the image data is size changed and moved. If NO in step S9, step S13 follows and the image output device executes a predetermined process on the received image and outputs a result (the mode of FIG. 9E). If YES in step S9, step S10 follows and a check is made to see if the image data is rotated or not. If NO in step S10, the processing routine advances to step S11. The outline image processor extracts the outline data from the received image data, the size change/movement processes are performed to the extracted outline data, and the binary image is reproduced from the outline data which was subjected to the size change/ movement processes. Subsequently, step S13 follows and the image output device outputs the reproduced binary image (the mode of FIG. 9G). If YES in step S10, step S12 follows and the outline image processor extracts the outline data from the received image data, the size change/ movement/rotation processes are performed on the extracted outline data, and the binary image is reproduced from the outline data which was subjected to the size change/ movement/rotation processes. Subsequently, step S13 follows and the image output device outputs the reproduced binary image (the mode of FIG. 9F).

Although an explanation regarding the smoothing process has been omitted in the above description of the flowchart, the outline image processor executes the first smoothing process after the extraction of the outline data and executes the second smoothing process before the reproduction of the binary image.

The operator can set one of the modes of FIGS. 9A to 9D and one of the modes of FIGS. 9E to 9G by the operation panel 1-103. The parameter setter sets parameters on the basis of the contents of the table stored in the ROM 1-101 shown in FIG. 11 corresponding to the setting of the operator. The set parameters are used for the checks in steps S3, S4, S6, S9, and S10 in the flowcharts of FIGS. 10A and 10B. The modes of FIGS. 9B and 9E are set as a default.

When the process is limited to the rotation of the image of 90°, the 90° rotation of the image is realized merely by replacing the (x) coordinate and (y) coordinate of the outline vector coordinate data without using the arithmetic operating method shown in FIG. 4. In this case, the image processing time can be reduced more than that in case of executing the arithmetic operation of FIG. 4.

The invention can be also applied to a system comprising a plurality of equipment or an apparatus comprising one piece of equipment. It will be obviously understood that the invention can be also applied to a case where the invention is achieved by supplying programs to a system or an apparatus.

As described above, each process of the size change of the image, rotation/movement of the image, and smoothing of the outline portion of the image can be executed in a data format of one kind such as outline vector coordinate data by the image processing apparatus of the embodiment. The arithmetic operating time which is required for a series of image processes can be reduced.

The pipeline processes of the image which was divided into the stripes can be performed by the arbitration of the internal processes by the process arbitrator, so that the time which is required for the arithmetic operations of the image can be reduced.

Further, the conventional image process communicating apparatus generates an image at a ratio of one page of a predetermined paper per one image. According to the image process communicating apparatus of the embodiment, when the images are received and outputted onto the paper, a plurality of images can be arranged and printed and outputted onto one page of the paper by rotating and moving the images and by changing the images to their proper sizes. This brings about an advantageous economic effect because the number of pages to be actually printed and outputted and the number of pages to be used can be reduced.

On the other hand, among the images to be printed and outputted in the image process communicating apparatus, there are many images such that it is not always necessary to make one image correspond to one page of paper and to output it. On the contrary, by executing the size change/rotation/movement processes on the image in which a plurality of images are used in one page of paper, a plurality of images can be easily printed and outputted by executing the size change/rotation/movement processes on those images and arranging the processed images on one page of pages of a predetermined size. Such a construction is simpler than the conventional image process communicating apparatus.

In the facsimile according to such another embodiment, the print output section (1-9 in FIG. 2) of the facsimile device can be unified with the printer of the JIS standard A3 size by using the size change/rotation/movement of the image according to the invention. Thus, since the facsimile device can be designed by using the exclusive-use printer of the A3 size with respect to a facsimile device in which the exclusive-use printer of the A3 size and the exclusive-use printer of the A4 size have individually been designed, the costs can be remarkably reduced.

In the embodiment, the plurality of output modes can be designated, so that it is easy to operate the apparatus for the user.

According to the embodiment, since the rotation/size change/movement can be realized by one circuit (processing section), the construction of the apparatus is simplified.

According to the invention as mentioned above, the high speed image processes can be executed.

What is claimed is:

1. An image processing apparatus comprising:
   input means for inputting image data;
   designation means for designating one of a plurality of output modes including a first output mode in which image data is enlarged or reduced, rotated and moved and then outputted, and a second output mode in which image data is outputted without changes; and
   control means for (1) controlling extraction means, processing means, reproduction means and output means such that the extraction means extracts vector information representing an outline of an image from the image data inputted by said input means, the processing means processes the extracted vector information, the reproduction means reproduces image information based on the processed vector information, and the output means outputs image data based on the reproduced image information, if the first output mode is designated by said designation means, and (2) executing a prescribed processing of the image data inputted by said input means and controlling the output means to output the image data upon which the prescribed processing has been executed, if the second output mode is designated by said designation means.

2. An apparatus according to claim 1, further comprising the output means, wherein said output means visually outputs the image data.

3. An apparatus according to claim 2, wherein said output means comprises a printer.

4. An apparatus according to claim 1, wherein said input means inputs the image data via a public telephone network.

5. An apparatus according to claim 1, wherein said input means comprises a scanner.

6. An apparatus according to claim 1, wherein said control means controls the extraction means, the processing means, the reproduction means and the output means such that the extraction means extracts vector information representing outlines of images from a plurality of pages of the image data inputted by said inputting means, the processing means enlarges or reduces, rotates and moves the extracted vector information for the plurality of pages, the reproduction means reproduces image information for one page of the enlarged or reduced, rotated and moved vector information, and the output means outputs image data based on the reproduced image information, if the first output mode is designated by said designation means.

7. An apparatus according to claim 1, wherein the plurality of output modes include a third output mode in which image data is enlarged or reduced in response to the size of a recording medium, and wherein said control means controls the processing means to enlarge or reduce the extracted vector information in response to the size of the recording medium, if the third output mode is designated by said designation means.

8. An image processing method comprising the steps of:
   inputting image data into an image processing apparatus;
   designating one of a plurality of output modes for the image processing apparatus including a first output mode in which the input image data is enlarged or reduced, rotated and moved, and then outputted and a second output mode in which image data is outputted without changes;
   extracting vector information representing an outline of an image from the image data inputted in said inputting step, processing the extracted vector information, reproducing image information based on the processed vector information, and outputting image data based on the reproduced image information, if the first output mode is designated in said designating step; and
   executing a prescribed processing of the image data inputted in said inputting step and outputting the image data upon which the prescribed processing has been executed, if the second output mode is designated in said designating step.

9. A method according to claim 8, wherein said outputting steps visually output the image data.

10. A method according to claim 9, wherein said outputting steps comprise outputting the image data with a printer.

11. A method according to claim 8, wherein said inputting step inputs the image data via a public telephone network.

12. A method according to claim 8, wherein said inputting step comprises the step of inputting image data with a scanner.

13. A method according to claim 8, wherein said extracting step extracts vector information representing outlines of images from a plurality of pages of the image data inputted in said inputting step, wherein said processing step enlarges or reduces, rotates, and moves the extracted vector information for the plurality of pages, wherein said reproducing step reproduces image information for one page of the enlarged or reduced, rotated, and moved vector information, and wherein said outputting step outputs image data based on the reproduced image information, if the first output mode is designated in said designating step.

14. A method according to claim 8, wherein the plurality of output modes include a third output mode in which image data is enlarged or reduced in response to the size of a recording medium, wherein said designating step further comprises the step of designating one of the first, second, and third output modes, and wherein said method further comprises the step of enlarging or reducing the extracted vector information in response to the size of the recording medium, if the third output mode is designated in said designating step.

* * * * *

UNITED STATES PATENT AND TRADEMARK OFFICE
CERTIFICATE OF CORRECTION

PATENT NO. : 5,694,486
DATED : December 2, 1997
INVENTOR(S) : NOBUYUKI SHIGEEDA, ET AL.

It is certified that error appears in the above-identified patent and that said Letters Patent is hereby corrected as shown below:

DRAWING SHEET 7
    Fig. 9D, "CHANGE" should read --CHANGED--.

COLUMN 1
    Line 15, "thinning" should read --a thinning--.

COLUMN 2
    Line 37, "an" should read --a--.

COLUMN 9
    Line 12, "to the" should read --on the--.

COLUMN 10
    Line 35, "to the" should read --on the--.

UNITED STATES PATENT AND TRADEMARK OFFICE
CERTIFICATE OF CORRECTION

PATENT NO. : 5,694,486
DATED : December 2, 1997
INVENTOR(S) : NOBUYUKI SHIGEEDA, ET AL.

It is certified that error appears in the above-identified patent and that said Letters Patent is hereby corrected as shown below:

COLUMN 11

Line 1, "in" should read --in the--.
Line 43, "another" should read --other--.

Signed and Sealed this

Second Day of June, 1998

BRUCE LEHMAN

*Attest:*

*Attesting Officer*  *Commissioner of Patents and Trademarks*